United States Patent Office 3,322,639
Patented May 30, 1967

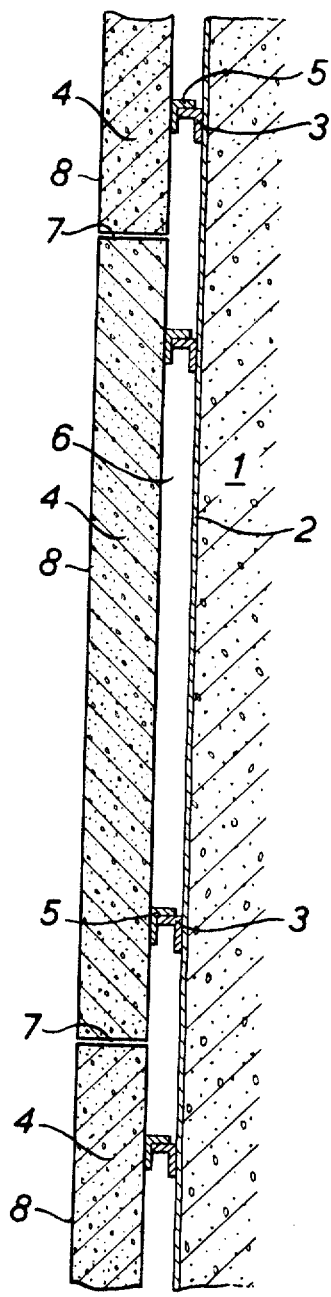

3,322,639
NUCLEAR REACTORS
Ian Davidson, Appleton, Warrington, England, assignor to United Kingdom Atomic Energy Authority, London, England
Filed Aug. 12, 1965, Ser. No. 479,246
Claims priority, application Great Britain, Aug. 29, 1964, 34,065/64
2 Claims. (Cl. 176—44)

This invention relates to nuclear reactors and in particular to that kind of nuclear reactor which employs a liquid moderator which also serves as the reactor coolant.

Hitherto, a steel pressure vessel has been employed to contain the core and moderator/coolant of the said kind of reactor. With the advent of pre-stressed concrete pressure vessels (which combine the functions of pressure vessel and biological shield which functions hitherto had to be separately provided) for gas-cooled reactors, it has been possible by development in the gas-cooled reactor field to overcome the main difficulty associated with the use of concrete pressure vessels, namely the necessity for avoiding a large temperature gradient across the wall of the vessel which would be unacceptable on structural and safety grounds. With a liquid moderated reactor, the means of overcoming the difficulty as developed for gas-cooled reactors were found not to be applicable, because thermal insulation which is satisfactory in a gas is not satisfactory in liquid.

It is therefore an object of the invention to provide a nuclear reactor of the liquid moderated and cooled kind and having a concrete pressure vessel, in which the said main difficulty associated with the employment of a concrete pressure vessel is wholly or largely overcome.

According to the invention, a nuclear reactor of the liquid moderated and cooled kind, having a pre-stressed concrete pressure vessel containing the reactor core and liquid moderator/coolant, the vessel being provided with an internal metal lining in contact with the concrete thereof, has thermal insulation members disposed adjacent to, but spaced from said metal lining, the mutual location of said members providing gaps therebetween so as to allow restricted communication between that part of the vessel interior which contains the reactor core and the space between the members and the metal lining of the vessel, whereby liquid moderator/coolant is allowed, by virtue of the said restricted communication, to occupy said space without the said members being subjected to differential pressure, the restricted communication, being such as largely to prevent heat transfer by convection between the main body of moderator/coolant liquid and that in said space.

The said members may be blocks of foamed concrete each encased in stainless steel where the reactor concerned is of the water moderated/coolant kind.

In order that the invention may be fully understood and more readily carried into practice, a constructional example embodying the invention will now be described with reference to the sole figure of the accompanying drawing, which is a fragmentary detached sectional side view of one wall of a concrete pressure vessel for a nuclear reactor of the boiling water kind.

Referring to the drawing, a cylindrical pre-stressed concrete pressure vessel for a 300 mw.(e) boiling water nuclear reactor is typically 21 ft. 6 ins. internal diameter, and has a wall, part of which is illustrated and designated 1, which is typically 11 ft. thick. There is provided in contact with the internal surface of the concrete a metal liner 2 typically ½ inch thick.

Brackets 3 are secured to the metal liner 2 at spaced intervals and serve to support blocks 4 of solid thermal insulation via brackets 5 secured to the blocks, so that the blocks 4 are spaced from the metal liner 2 by a space 6 typically 3 ins. deep. The blocks typically are 6 ft. x 6 ft. and 6 ins. thick and are fabricated from foamed concrete encased in stainless steel casings 8 typically of 10 gauge sheet material. The blocks 4 are positioned so that there is typically a ⅜ inch gap 7 (when cold) between the ends and sides of adjacent blocks.

The gaps 7 left at the ends and sides of the blocks 4 when they are disposed in operative position inside the reactor vessel serve to allow liquid moderator coolant to fill the space 6 between the blocks and the vessel liner 2 which provides a relatively static thermal barrier. It is calculated that not more than 0.05% of the reactor thermal heat is transferred via the gaps 7 to the liquid coolant moderator in the said space, and this amount can readily be dealt with by the normal inbuilt cooling system (not shown but typically consisting of water cooling pipes embedded in the concrete and contacting the metal liner 2) employed to minimise temperature gradient across the wall thickness of concrete of the vessel.

I claim:
1. In a liquid moderated, liquid cooled nuclear reactor, a prestressed concrete pressure vessel containing the reactor core and with the liquid moderator/coolant in contact with the internal surface of the vessel, the vessel having an internal metal lining in contact with the internal surface of the concrete thereof, thermal insulation members disposed adjacent to but spaced from said metal lining, said thermal insulation members being separated from one another by gaps of such width as to allow restricted communication between that part of the vessel interior which contains the reactor core and the space between the thermal insulation members and the metal lining of the vessel, whereby liquid moderator/coolant is allowed, by virtue of said restricted communication, to occupy said space without said thermal insulation members being subjected to differential pressure, the restricted communication being such as substantially to prevent heat transfer by convection between the main body of moderator/coolant liquid and the moderator/coolant liquid in said space.

2. A nuclear reactor according to claim 1, wherein said thermal insulation members are blocks of foamed concrete each encased in stainless steel and the moderator/coolant liquid in water.

References Cited
FOREIGN PATENTS

| | | |
|---|---|---|
| 1,364,660 | 5/1964 | France. |
| 795,826 | 5/1958 | Great Britain. |
| 861,513 | 3/1961 | Great Britain. |
| 867,825 | 5/1961 | Great Britain. |
| 871,119 | 6/1961 | Great Britain. |
| 877,383 | 9/1961 | Great Britain. |
| 1,012,262 | 12/1965 | Great Britain. |

REUBEN EPSTEIN, Primary Examiner.